United States Patent [19]

Ringger et al.

[11] Patent Number: 5,165,626
[45] Date of Patent: Nov. 24, 1992

[54] PARTIAL CLASS DIVIDER ASSEMBLY FOR AN AIRCRAFT

[76] Inventors: George J. Ringger, 3640 N.W. 52nd St., Miami, Fla. 33142; Stanley M. Hooper, 8860 S.W. 155 Terr., Miami, Fla. 33157

[21] Appl. No.: 783,862

[22] Filed: Oct. 28, 1991

[51] Int. Cl.$^5$ .............................................. B64C 1/10
[52] U.S. Cl. ............................ 244/118.5; 160/229.1; 160/234; 160/231.1; 16/872; 16/282
[58] Field of Search ............... 244/118.1, 118.5, 118.6, 244/129.1, 129.4, 129.5, 117 R, 119, 121; 160/198, 234, 229.1, 231.1, 231.2, 87.2; 16/87 R, 280, 282, 365, 314; 410/117, 118

[56] References Cited

U.S. PATENT DOCUMENTS

| | | | |
|---|---|---|---|
| 6,052 | 1/1849 | Taft | 16/282 |
| 1,763,377 | 4/1876 | Stinson | 16/282 |
| 2,081,529 | 5/1937 | Conney | 244/118.6 |
| 2,210,652 | 8/1940 | Dennett | 160/231.1 |
| 2,396,039 | 3/1946 | Burton et al. | 244/118.5 |
| 2,514,370 | 7/1950 | Bunnell | 166/231.1 |
| 2,710,731 | 6/1955 | Bright et al. | 244/118.6 |
| 3,423,121 | 1/1969 | Lipkin | 244/121 |
| 4,597,549 | 7/1986 | Ryan | 244/129.5 |
| 4,899,962 | 2/1990 | Mueller | 244/118.1 |

Primary Examiner—Galen Barefoot
Attorney, Agent, or Firm—Malloy, Downey & Malloy

[57] ABSTRACT

A partially movable divider assembly primarily designed for mounting to an overhead structure, such as a passenger service unit rail or ceiling, in the cabin interior of an aircraft, to provide a privacy barrier between two seating sections of different classes. An upper stationary panel is fixedly mounted to the overhead structure and a lower movablle panel is hingedly attached along a bottom edge of the upper panel to permit swinging movement of the lower panel relative to the upper panel in response to a force applied to the lower panel. A biasing element and dampening structure urge the lower panel into a normal vertical position in coplanar relation to the upper panel, while reducing excessive swinging movement thereof.

8 Claims, 5 Drawing Sheets

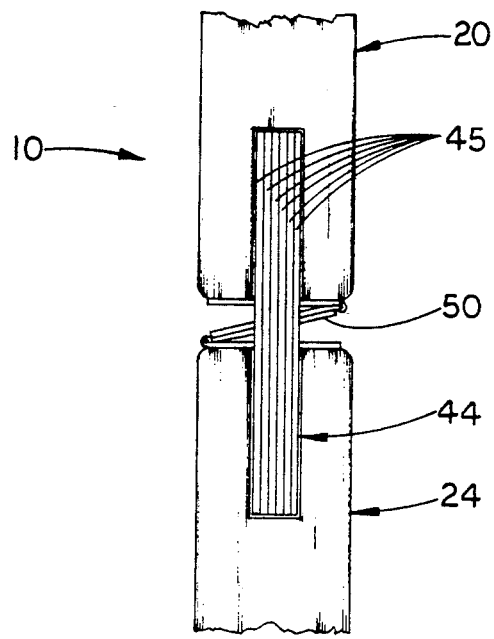
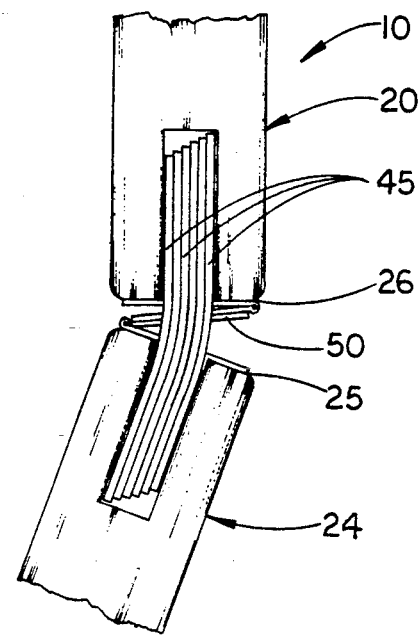
FIG 5    FIG 6
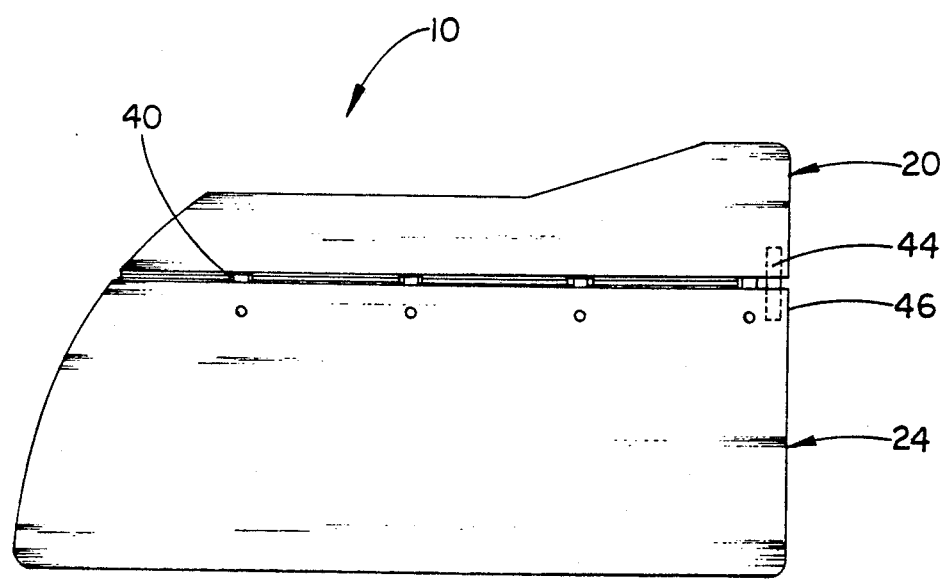
FIG 3

PARTIAL CLASS DIVIDER ASSEMBLY FOR AN AIRCRAFT

BACKGROUND OF THE INVENTION

The present invention relates to a partial class divider assembly for providing a privacy barrier between different classes of seating on a passenger aircraft. More specifically, the present invention includes a partial bulkhead structure having an upper stationary panel fixedly secured to an overhead structure in the in the aircraft's interior and a lower movable panel hingedly attached to the upper panel along correspondingly positioned edges thereof, wherein the lower panel is adapted to be swingably moved in either a forward or rearward direction upon applying a force thereto.

On most commercial airliners, there are at least two different classes of seating, namely a first class section and a coach or tourist class section. The fare to fly in the first class section is usually significantly higher than the fare for the coach section and accordingly the services in first class are usually somewhat more elaborate. In order to distinguish the first class section from the coach section, it is usually desirable to have some type of dividing barrier extending therebetween. Ordinarily, on most commercial airliners, a rigid one-piece bulkhead extends from the floor to the ceiling between the last row of seats in first class and the first row of seats in the coach section. During the flight, a curtain is usually drawn across the aisle connecting between the rigid bulkheads to complete the barrier or divider between the two classes. Presently, there is a federal aviation authority requirement that a minimum distance be maintained between a passenger and a rigid structure. In the fore and aft direction, a minimum distance of 35" must be maintained between the passenger and a rigid structure, such as a rigid bulkhead, in order to provide a sufficient head strike clearance in the event of an emergency situation. Accordingly, when there is a rigid bulkhead dividing the last row of seats in first class from the first row of seats in coach, the distance (pitch) between a seat in the first row in coach and the next seat directly forward in the last row in first class must be sufficiently greater than the fore and aft distance maintained between other seats along the length of the aircraft. Thus, a considerable amount of space is consumed in order to accommodate the 35" head strike clearance requirement, usually resulting in the loss of a full row of additional seats somewhere in the aircraft. If the standard rigid bulkhead were removed and replaced with a collapsible or movable structure, then the 35" head strike clearance distance would not apply. This would allow the first row of seats in the tourist class to be moved forward and when combined with normally existing extra space between seats, there is enough fore and aft space available for an additional row of seats. On the average commercial airliner, the addition of an extra row of seats would result in an increase of revenue of over $1.5 million dollars per year.

In view of the aforementioned, it is an object of the present invention to provide a partial class divider assembly structured to be attached to the ceiling or overhead structure on the interior of the aircraft and which is adapted to pivot or swing either forward or rearward when subjected to a load, thereby eliminating the 35" minimum head strike clearance requirement.

It is a further object of the present invention to provide a partial class divider assembly which is adapted to be mounted to an overhead structure in the interior of the aircraft so as to be oriented in a substantially vertical orientation extending down from the ceiling and terminating substantially above the floor.

It is yet another object of the present invention to provide a partial class divider assembly adapted to provide a privacy barrier between passenger seating sections of different classes on an aircraft while still permitting a passenger sitting in the first row of one class to extend his legs under the divider assembly and further permitting carry-on luggage to be stored under the last row of seats just forward of the divider assembly, thereby increasing the overall available storage space in the aircraft.

Yet another, and extremely important object of the present invention is to provide a class divider assembly which is movable when subjected to a load and therefore not subject to the 35" head strike clearance requirement, thereby creating additional space and allowing an additional row of seats to be added to the aircraft.

These and other objects and advantages of the present invention will be more readily apparent from the description which follows.

SUMMARY OF THE INVENTION

The present invention relates to a partial class divider assembly adapted to be mounted to the ceiling or other overhead structure in the cabin interior of a passenger aircraft so as to provide a privacy barrier between two passenger seating sections of different classes. The divider assembly includes an upper stationary panel which preferably mounts to a passenger service unit rail extending along the length of the aircraft above the seats. A second movable panel is hingedly attached along a top edge thereof to an adjacently positioned bottom edge of the top panel so as to be swingably movable in a fore and aft direction relative to the top panel. Normally, the upper panel and lower panel are positioned in a substantially vertical, coplanar orientation with a bottom edge of the lower panel disposed in substantially spaced relation above the floor of the aircraft. The upper and lower panels are specifically shaped and configured so as to substantially conform with the adjacent interior cabin structure, accommodating for the curvature of the inner walls, ceiling and overhead storage compartments.

The lower panel is attached to the upper panel by means of a piano-type hinge or other like structure attaching to and hingedly connecting between the bottom edge of the upper panel and the correspondingly, adjacently positioned top edge of the lower panel. The upper panel includes a plurality of bores extending vertically therethrough between the top and bottom edges thereof. The lower panel also includes a plurality of bores extending partially therethrough down through the top edge thereof and each being positioned so as to be in axial alignment with a corresponding one of the bores extending through the upper panel. A biasing means is fitted within the bores, connecting between the upper and lower panels, being specifically structured to urge the lower panel into a normally vertical position in coplanar relation with the upper panel.

In order to retard the oscillating fore and aft motion of the lower panel in response to a force applied thereto, a dampening means is provided in the upper and lower panels. The dampening means acts in cooperation with the biasing means to urge the lower panel into the vertical, coplanar position relative to the upper panel in opposition to an external force applied to the lower panel.

The invention accordingly comprises the features of construction, a combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 3 is a front plan view of the divider assembly of the present invention.

FIG. 5 is an isolated plan view shown in cutaway illustrating a dampening means and hinged attachment between upper and lower panels of the divider assembly.

FIG. 6 is an isolated plan view shown in cutaway illustrating the lower panel moved in a forward angled position relative to the upper panel.

Like reference numerals refer to like parts throughout the several views of the drawings.

DETAILED DESCRIPTION OF THE PREFERRED EMBODIMENT

Figure 1:
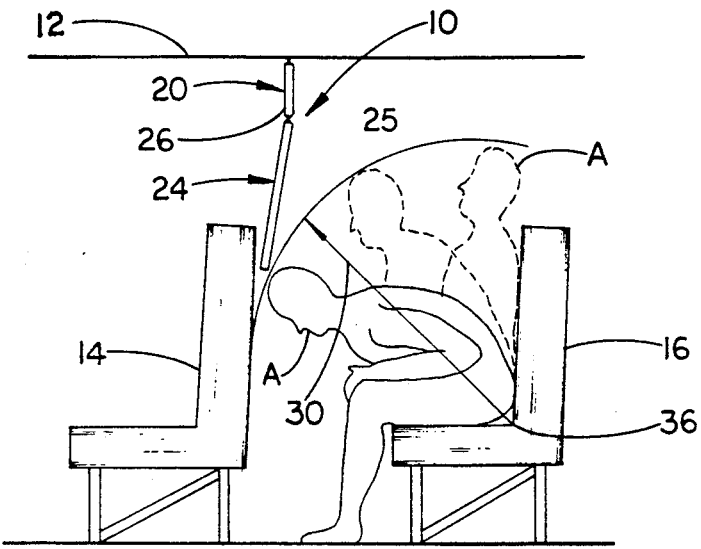
FIG. 1 is a side plan view of the class divider assembly of the present invention mounted between two rows of seats on a passenger aircraft illustrating forward movement of a lower panel thereof.
Figure 2:
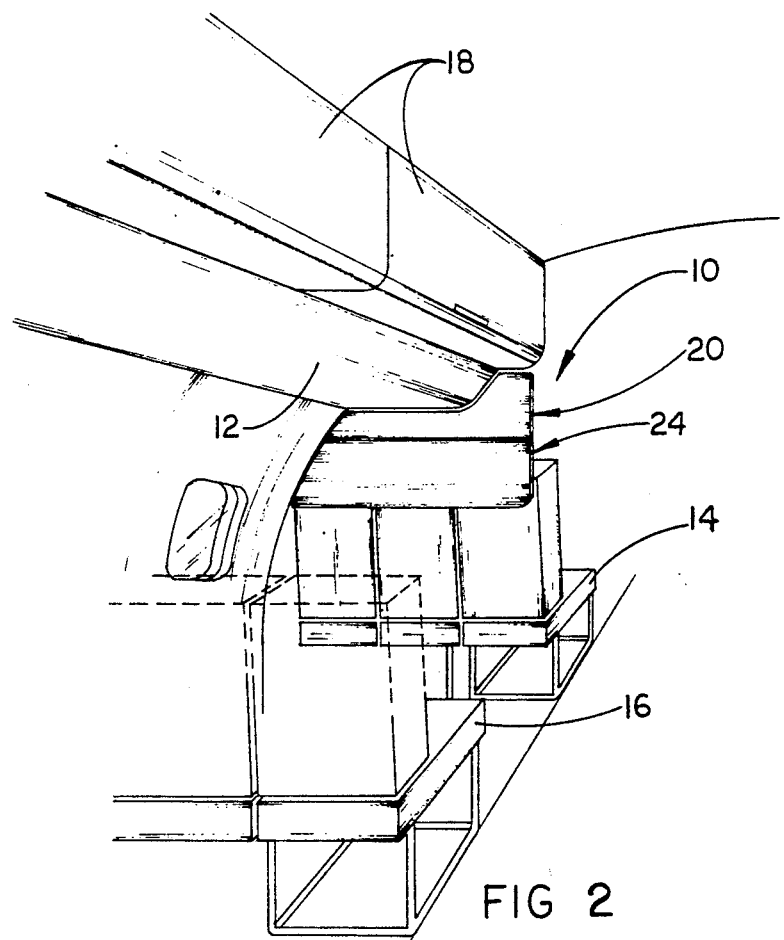
FIG. 2 is a perspective view of the class, divider assembly of the present invention mounted to an overhead structure in the interior cabin of a passenger aircraft.

Referring initially to FIGS. 1 and 2, the present invention is directed to a partial bulkhead assembly,, generally indicated as 10, adapted to be mounted to an overhead structure 12 on the interior cabin of a passenger aircraft so as to extend transversely there across between a last row of seats 14 in one class and a first row of seats 16 in another class.

The partial bulkhead assembly 10 includes an upper stationary panel 20 which is specifically structured and configured for mounting to the overhead structure 12. A lower movable panel 24 is hingedly attached along a top edge 25 to a bottom edge 26 of the upper panel 20 so as to be movable in a fore and aft direction relative to the upper stationary panel 20 in response to a force applied thereto. As illustrated in FIG. 1, as the head and upper body of a passenger A sitting in the first row of seats 16 in the tourist class of the aircraft moves forward and down through an arc, (indicated by the arrow 30) the passenger's head A will contact the lower movable panel 24 causing it to move in a forward angled position, thereby minimizing injury to the passenger A. Accordingly, in view of the fact that the partial bulkhead assembly 10 is not a rigid structure, but rather a breakover structure, the distance between the row of seats 14 and the row of seats 16 can be decreased. Ordinarily, a rigid bulkhead is placed between the row of seats 14 and the row of seats 16 and thus, a minimum head strike clearance distance of 35" must be maintained, measured from the base 36 of the seat 16 to the rigid structure. In this manner, as a passenger's upper body moves forward and downward, the passenger's head would not strike the rigid structure. Because the lower movable panel 24 of the present invention is adapted to move forward in response to a force applied thereto, the 35" minimum head strike clearance requirement does not apply.

Referring now to the specific structural features of the partial bulkhead assembly 10, the upper stationary panel 20 and lower movable panel 24 are hingedly connected along adjacently positioned edges 25, 26 allowing the lower panel 24 to be movable in a fore and aft direction. A plurality of biasing elements 40 connect between the upper panel 20 and lower panel 24, at spaced intervals along the length of the correspondingly positioned edges 24, 25, 26, as seen in FIG. 3. The biasing elements 40 are specifically structured to urge the lower panel into a substantially vertical position, in coplanar relation with the upper panel 20. A dampening means 44 is also provided along an inboard side 46 of the bulkhead assembly 10 to prevent excessive swinging, oscillating movement of the lower panel 24, while cooperating with the biasing elements 40 to urge the lower panel 24 into the vertical position.

Figure 4:
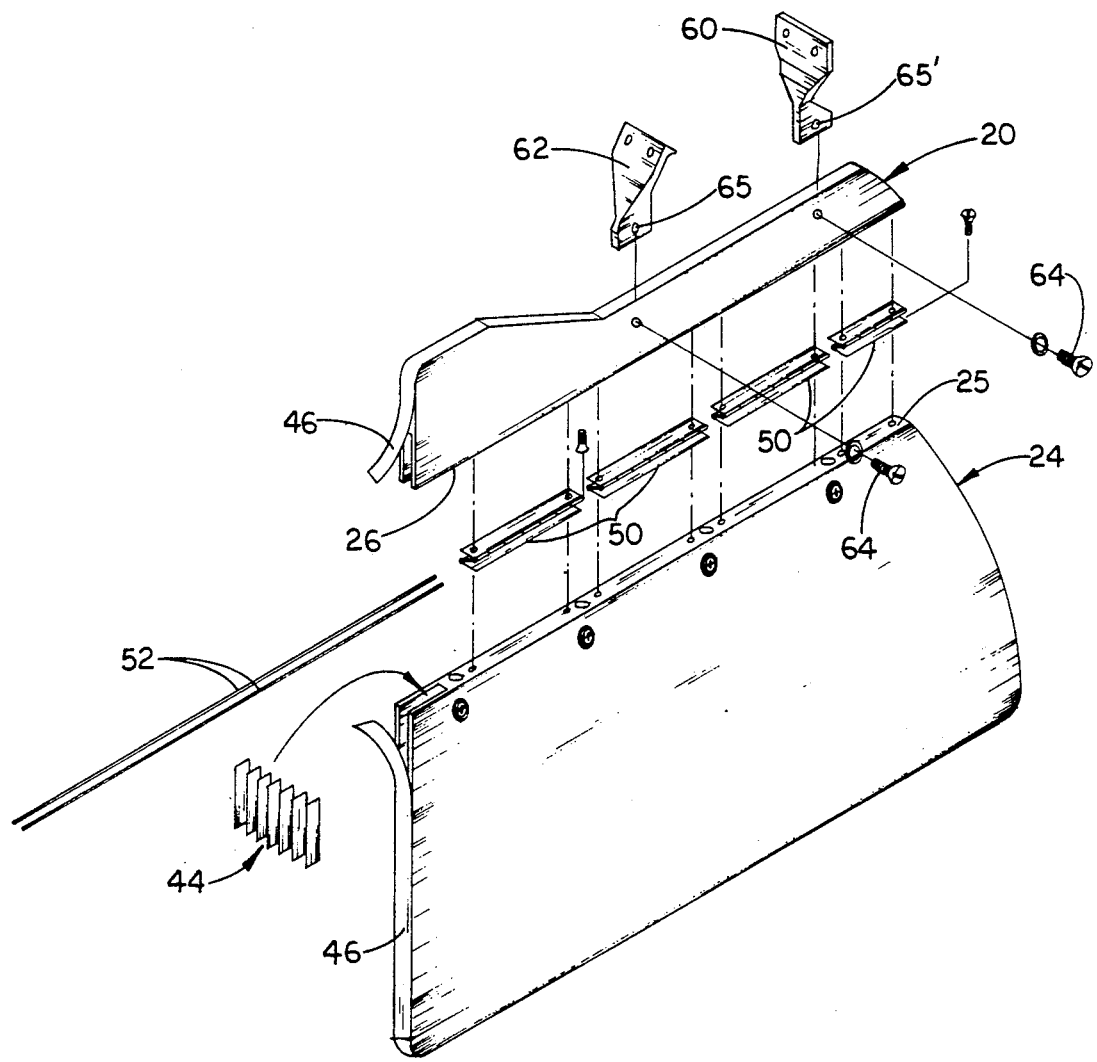
FIG. 4 is an exploded view shown in perspective illustrating the various structural components of the divider assembly of the present invention.
Figure 7:
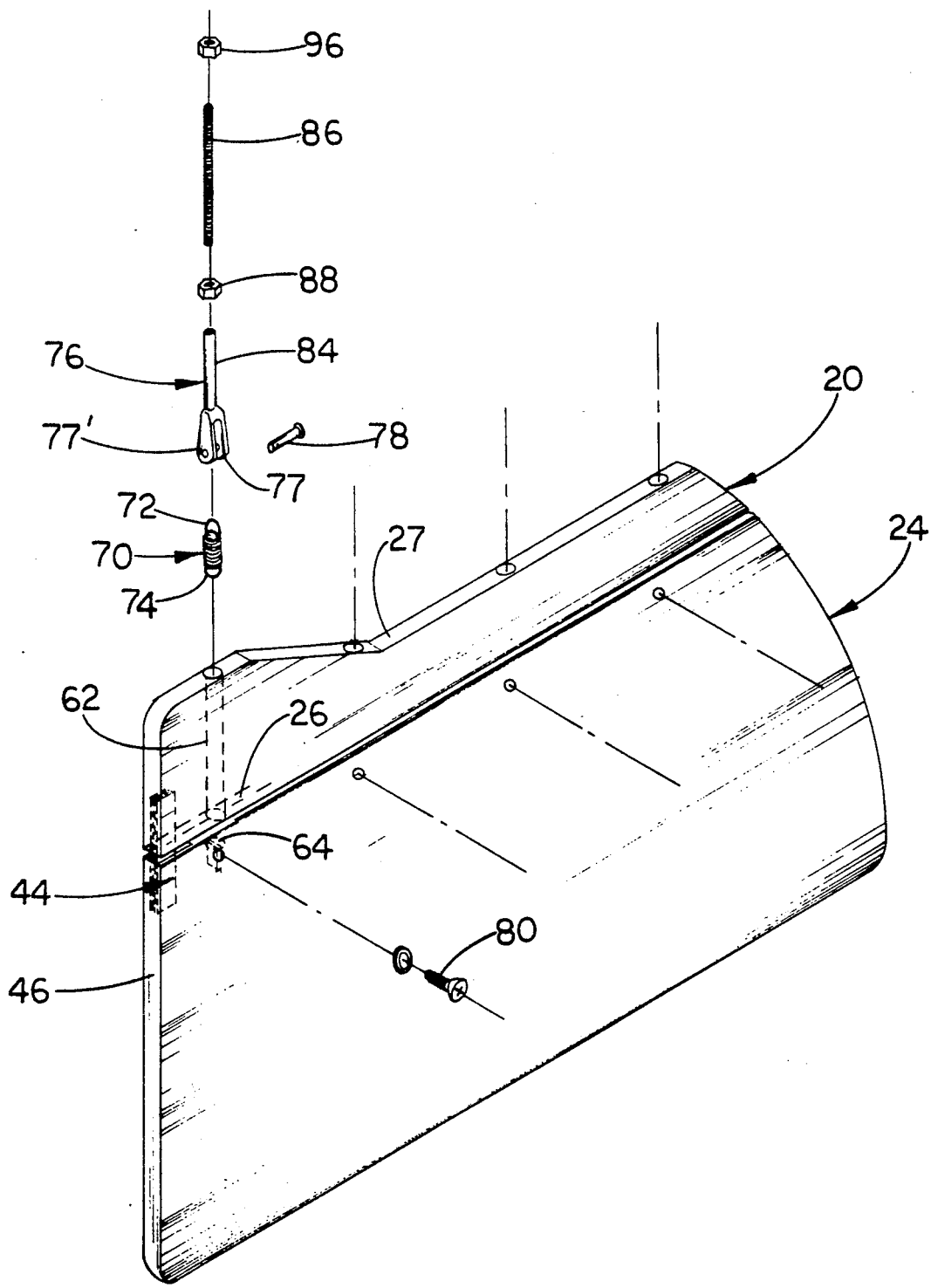
FIG. 7 is a partial exploded view shown in perspective the divider assembly of the present invention illustrating various structural elements of a biasing means in the preferred embodiment of the present invention.

Referring to FIG. 4, the upper panel 20 and lower panel 24 are preferably interconnected with a plurality of piano hinges 50 which interconnect to and extend between the top edge 25 of the lower panel and bottom edge 26 of the upper panel. A pair of rods 52 are fed through channels on opposite sides of the hinges 50 so as to properly align the hinges 50 relative to one another in a substantially straight, linear orientation. On the inboard side 46 of the bulkhead assembly, a slot is formed in each of the upper and lower panels respectively for housing the dampening means 44 therein. In the preferred embodiment, the dampening means includes a plurality of separate, relatively thin metal plates which are arranged in a stacked orientation and fitted within the slots 54 and 56 in the upper 20 and lower 24 panels, respectively.

To facilitate mounting to passenger service unit rails extending longitudinally through the aircraft, a pair of mounting brackets 60, 62 are provided. The mounting brackets 60, 62 are attachable to a top of the upper panel 20, being secured thereto by conventional fastening means 64 fitted through apertures 65, 65' on the brackets. The mounting brackets 60, 62 can be of various structural configurations in order to accommodate for varying overhead structures in different types of aircraft.

The dampening means is illustrated in more detail in FIGS. 5 and 6 and preferably includes a plurality of substantially thin metal plates arranged in stacked orientation and fitted within the slots 54, 56, extending therebetween. As seen in FIG. 6, as the lower panel 24 is moved into an angled position relative to the upper panel 20, the plurality of plates 45 move relative to one another so as to act as a type of leaf spring. As an external force being applied to the lower panel 24 is released, the lower panel 24 will assume the vertical position, in coplanar orientation with the upper panel 20, without swinging excessively back and forth.

Figure 8:
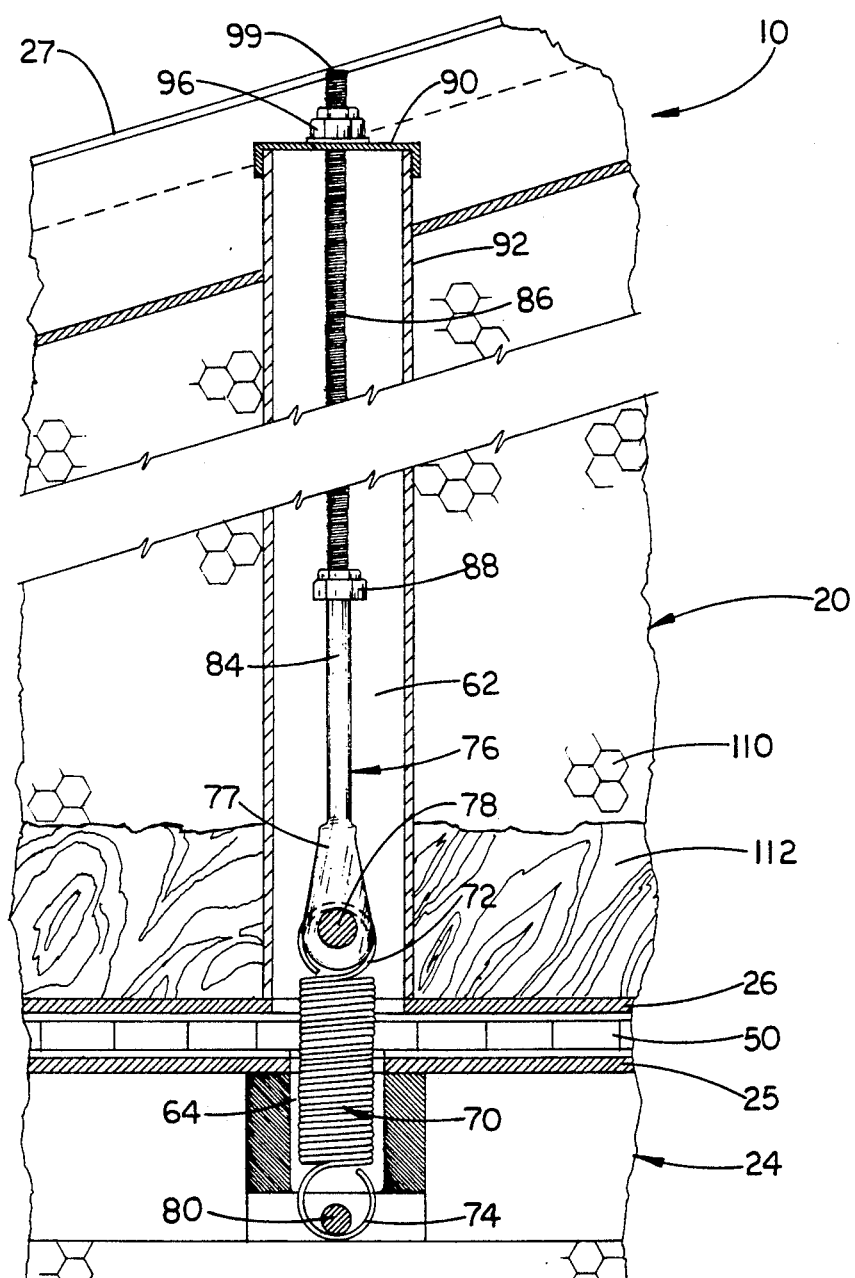
FIG. 8 is an isolated plan view shown in partial section illustrating the attachment of the biasing means between the upper and lower panel in a preferred embodiment of, the present invention.
Figure 9:
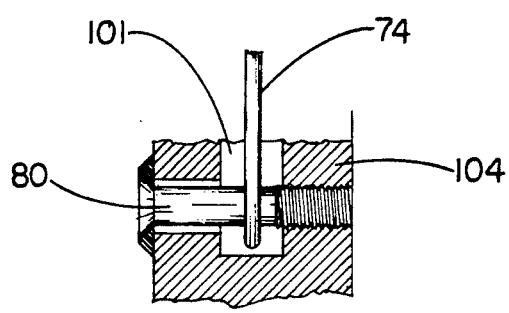
FIG. 9 is an isolated plan view shown in partial section illustrating attachment of the lower end of a spring within the interior of the lower panel.

An important feature of the present invention is the biasing elements 40 which connect between the upper panel 20 and the lower panel 24 at space intervals along the length of the panels. In the preferred embodiment, a spring assembly is used in each of the biasing elements 40. Each of the spring assemblies are fitted within one of a plurality of co-axially aligned bores, including an upper bore 62 extending vertically through the upper panel 20 between the top 27 and bottom 26 thereof. Co-axially aligned with each of the upper bores 62, there are corresponding lower bores 64 which extend partially into the lower panel 24 through the top edge 25 thereof. The spring assembly of each of the biasing elements 40 includes a spring 70 having hooks 72, 74 at opposite ends thereof. The spring 70 is adapted to be connected at the opposite ends 72, 74 between the upper panel 20 and lower panel 24 within the co-axially aligned bores 62, 64. The top hook 72 of the spring 70 is attachable to a clevis 76 having a pair of oppositely disposed parallel flanged portions 77 adapted for passage of a keeper pin 78 therebetween. With the hook portion 72 of the spring 70 fitted between the flanged portions 77, 77', the keeper pin is inserted so as to pass through the hook portion 72 attaching the upper end of the spring 70 to the clevis 76, as best illustrated in FIG. 8. The lower hook portion 74 on the bottom end of the spring 70 is positionable within the lower bore 64 in the lower panel 24 and is attached thereto by a screw 80 which passes through the lower hook portion 74, as seen in FIGS. 8 and 9. The upper portion of the clevis 76 includes a hollow tubular portion 84 having a threaded interior. A threaded rod 86 is adapted to be threadably engaged within the threaded hollow interior of the tubular portion 84 and is maintained in fixed attachment therewith by means of a locking nut 88 on the rod 86. The threaded rod 86 extends up through the upper bore 62 and through a cap 90. The cap 90 is fitted over an open top end of a cylindrical sleeve 92 which extends through the upper bore 62. A washer and nut 96 fitted to an end of the rod 86 above the cap 90 is adapted to be threadably advanced so as to engage a top surface of the cap 90. Continued threaded advancement of the nut 96 serves to direct the rod 86 upwardly pulling the attached clevis 76 upward and thereby applying tension to the spring 70. Once the spring 70 is pulled to the desired tension, the distal end 99 of the threaded rod 86 can be removed so as to be flush with the top edge 27 of the upper panel.

Both the upper panel 20 and the lower panel 24 include an inner core 110 preferably formed of a honeycomb composite material or other lightweight composite material adapted to withstand a significant force of impact. An outer exposed surface 112 on each of the opposite sides of the upper 20 and lower 24 panels may be covered with a carpet material or other decorative covering consistent with the cabin interior or the aircraft.

Referring to FIG. 9, the lower hook portion 74 of the spring 70 is adapted to fit within a slot 101 disposed at the bottom end of the lower bore 64 in the lower panel 24. The screw 80 is adapted to pass transversely through the slot 101 and through the lower hook portion 74, being threadably engaged within a wall portion 104 on an opposite side of the slot 101.

What is claimed is:

1. A bulkhead assembly adapted to be mounted to an overhead structure of an aircraft so as to define a boundary and provide privacy between seating sections of different classes, said assembly comprising:
    an upper stationary panel fixedly mounted to the overhead structure and extending transversely substantially along the width of a row of adjacently positioned seats,
    a lower movable panel hingedly mounted along a bottom edge of said upper stationary panel in substantially coplanar relation thereto and swingably movable from a substantially vertical, coplanar position to either a forward angled position or a rearward angled position relative to said upper stationary panel and said row of adjacently positioned seats upon applying external force thereto,
    hinge means for hingedly connecting said lower movable panel to said upper stationary panel,
    biasing means structured and disposed to urge said lower movable panel into said vertical, coplanar position,
    dampening means for reducing excessive swinging, oscillating movement between said forward angled position and said rearward angled position, and
    mounting means for mounting said upper stationary panel to the overhead structure of the aircraft.

2. An assembly as in claim 1 wherein said upper stationary panel is specifically shaped and configured so as to conform with a configuration of adjacently positioned structure within an interior cabin of the aircraft.

3. An assembly as in claim 2 wherein said hinge means includes a plurality of piano hinges each including a top plate, an intermediate plate, and a bottom plate Wherein said top plate is attachable to a bottom edge of said upper stationary panel and said bottom plate is attachable to a top edge of said lower movable panel.

4. An assembly as in claim 3 wherein said dampening means includes a plurality of substantially thin metal plates disposed in a stacked orientation and fitted within opposing upper and lower slots formed on an inboard edge of said upper and lower panels respectively.

5. An assembly as in claim 4 wherein said plurality of plates extend between said upper panel and said lower panel and are adapted to flex and slide relative to one another upon movement of said lower panel into either said forward angled position or said rearward angled position.

6. An assembly as in claim 5 wherein said plurality of plates are adapted to absorb a biasing force exerted by said biasing means on said lower panel so as to prevent excessive oscillating movement thereof once the external force, is removed.

7. An assembly as in claim 6 wherein said biasing means includes a plurality of spring assemblies each fitted within a respective one of a plurality of chambers extending through said upper panel and into said lower panel at spaced intervals along a length thereof.

8. An assembly as in claim 7 wherein each of said plurality of chambers include an upper bore extending vertically through said upper panel between a top edge and said bottom edge thereof and including a metal cylindrical sleeve fitted therethrough, and a lower bore extending through said top edge of said lower panel and disposed in co-axial relation to said upper bore, said lower bore including means therein for securing a bottom end of each said spring assembly therein.

* * * * *